US008457768B2

(12) United States Patent
Hammer et al.

(10) Patent No.: US 8,457,768 B2
(45) Date of Patent: Jun. 4, 2013

(54) CROWD NOISE ANALYSIS

(75) Inventors: Stephen C. Hammer, Marietta, GA (US); Christopher E. Holladay, Marietta, GA (US); William D. Morgan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 11/757,934

(22) Filed: Jun. 4, 2007

(65) Prior Publication Data

US 2008/0300700 A1 Dec. 4, 2008

(51) Int. Cl.
*G06F 17/00* (2006.01)

(52) U.S. Cl.
USPC .......... 700/94

(58) Field of Classification Search
USPC .......... 700/94; 704/224, 234; 381/57
See application file for complete search history.

(56) References Cited

U.S. PATENT DOCUMENTS

| | | | | |
|---|---|---|---|---|
| 5,504,476 | A * | 4/1996 | Marrs et al. | 340/7.48 |
| 5,550,924 | A * | 8/1996 | Helf et al. | 381/94.3 |
| 5,714,997 | A * | 2/1998 | Anderson | 348/39 |
| 6,035,341 | A * | 3/2000 | Nunally et al. | 709/253 |
| 6,414,914 | B1 | 7/2002 | Lee et al. | |
| 6,973,256 | B1 * | 12/2005 | Dagtas | 386/46 |
| 7,657,836 | B2 * | 2/2010 | Pan et al. | 715/723 |
| 2002/0176689 | A1 | 11/2002 | Heo et al. | |
| 2003/0061037 | A1 * | 3/2003 | Droppo et al. | 704/226 |
| 2005/0125223 | A1 | 6/2005 | Divakaran et al. | |
| 2006/0059120 | A1 | 3/2006 | Xiong et al. | |

FOREIGN PATENT DOCUMENTS

WO WO 2006099688 A1 8/2006

* cited by examiner

*Primary Examiner* — Joseph Saunders, Jr.
(74) *Attorney, Agent, or Firm* — Hoffman Warnick LLC; Matthew Chung

(57) ABSTRACT

The present invention generally provides a way to analyze crowd noise to identify "highlights" or the like. Specifically, an audio stream containing crowd noise from an event (e.g., sporting event, political rally, religious gathering, etc) is captured (e.g., using microphones) and time coded. The audio stream is normalized based on geography and processed to remove undesired artifacts and to identify a set (at least one) of highlights. Based on at least one threshold, at least one highlight is selected from the set of highlights.

22 Claims, 5 Drawing Sheets

CROWD NOISE ANALYSIS

FIELD OF THE INVENTION

The present invention generally relates to audio stream processing. Specifically, the present invention provides a way to identify and select a set of highlights for an event based on associated crowd noise.

RELATED ART

Public events have long been a part of our culture. For example, sporting events, political rallies, religious gatherings, etc. have all been a cause for a mass gatherings of individuals and media coverage. Selecting highlights from events has long been a tedious and expensive process. Currently, all highlight reels for events are created manually by an expert in the field. The expert will view the entire game or match and decide what would be a highlight. For sporting events, many times, highlights are identified based on score, which may be insufficient for something to warrant a highlight. No existing approach provides a way to identify a highlight automatically.

SUMMARY OF THE INVENTION

The present invention generally provides a way to analyze crowd noise to automatically identify “highlights” or the like. Specifically, an audio stream containing crowd noise from an event (e.g., sporting event, political rally, religious gathering, etc) is captured (e.g., using microphones) and time coded. The audio stream is normalized based on geography and processed to remove undesired artifacts and to identify a set (at least one) of highlights. Based on at least one threshold, at least one highlight is selected from the set of highlights.

One aspect of the present invention provides a method for analyzing crowd noise, comprising: receiving an audio stream for an event, the audio stream containing crowd noise; time coding the audio stream; normalizing the audio stream based on geography; and processing the audio stream to remove undesired artifacts and to identify a set of highlights from the crowd noise.

Another aspect of the present invention provides a system for analyzing crowd noise, comprising: a module for receiving an audio stream for an event, the audio stream containing crowd noise; a module for time coding the audio stream; a module for normalizing the audio stream based on geography; and a module for processing the audio stream to remove undesired artifacts and to identify a set of highlights from the crowd noise.

Another aspect of the present invention provides a program product stored on a computer readable medium for analyzing crowd noise, the computer readable medium comprising program code for causing a computer system to: receive an audio stream for an event, the audio stream containing crowd noise; time code the audio stream; normalize the audio stream based on geography; and process the audio stream to remove undesired artifacts and to identify a set of highlights from the crowd noise.

Another aspect of the present invention provides a method for deploying a system for analyzing crowd noise, comprising: providing a computer infrastructure being operable to: receive an audio stream for an event, the audio stream containing crowd noise; time code the audio stream; normalize the audio stream based on geography; and process the audio stream to remove undesired artifacts and to identify a set of highlights from the crowd noise.

Another aspect of the present invention provides computer software embodied in a propagated signal for analyzing crowd noise, the computer software comprising instructions for causing a computer system to: receive an audio stream for an event, the audio stream containing crowd noise; time code the audio stream; normalize the audio stream based on geography; and process the audio stream to remove undesired artifacts and to identify a set of highlights from the crowd noise.

Another aspect of the present invention provides a data processing system for analyzing crowd noise, comprising: a memory medium comprising instructions; a bus coupled to the memory medium; and a processor coupled to the bus that when executing the instructions causes the data processing system to: receive an audio stream for an event, the audio stream containing crowd noise, time code the audio stream, normalize the audio stream based on geography, and process the audio stream to remove undesired artifacts and to identify a set of highlights from the crowd noise.

One aspect of the present invention provides a computer-implemented business method for analyzing crowd noise, comprising: receiving an audio stream for an event, the audio stream containing crowd noise; time coding the audio stream; normalizing the audio stream based on geography; and processing the audio stream to remove undesired artifacts and to identify a set of highlights from the crowd noise.

Any of these aspects could also include one or more of the following aspects:

At least one highlight being selected from the set of highlights based on at least one threshold such as a level squelch threshold and a similarity squelch threshold.

The normalization of the auto stream comprising comparing a geographic characteristic of a participant of the event to a geographic characteristic of the event to identify a home participant of the event.

The processing of the audio stream comprising: identifying a target sound range; removing frequencies that vary from the target sound range by more than a predetermined tolerance; taking a level measurement of the audio stream over a predetermined time window to eliminate spikes; generating a frequency-domain representation of the audio stream; time averaging the audio stream to eliminate the spikes; applying a squelch algorithm to eliminate the undesired artifacts; and weighting the audio stream and the frequency-domain representation to produce a final response level measurement.

The event being any type of event that results in a gathering of at least one person such as a sporting event, a political rally, a religious gathering, etc. The audio stream being generated by a set of from participants and/or a set of attendees of the event.

The audio stream being captured using a set of microphones.

BRIEF DESCRIPTION OF THE DRAWINGS

These and other features of this invention will be more readily understood from the following detailed description of the various aspects of the invention taken in conjunction with the accompanying drawings in which.

Figure 1:
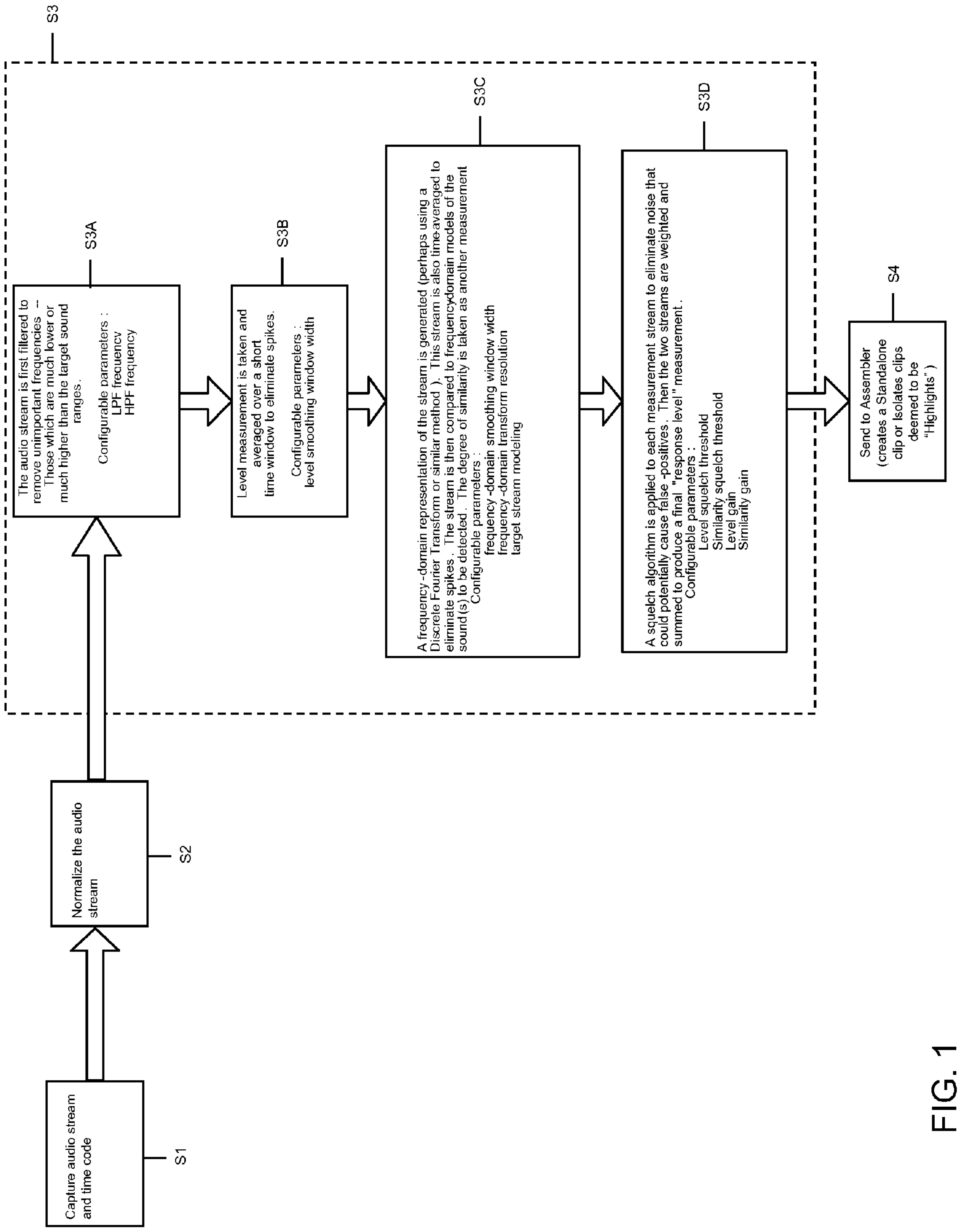
FIG. 1 depicts a method flow diagram according to the present invention

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the detailed description of the invention has the following sections:

I. General Description

II. Computerized Implementation

I. General Description

As used herein the following terms have these associated meanings:

"Set" means a quantity of at least one.

"Event" means any type of activity having a set of participants and a set of attendees. Examples include, among others, sporting events, political rallies, religious gatherings, etc.

As indicated above, the present invention provides a way to analyze crowd noise to automatically identify "highlights" or the like. Specifically, an audio stream containing crowd noise from an event (e.g., sporting event, political rally, religious gathering, etc) is captured (e.g., using microphones) and time coded. The audio stream is normalized based on geography and processed to remove undesired artifacts and to identify a set (at least one) of highlights. Based on at least one threshold, at least one highlight is selected from the set of highlights.

Referring now to FIG. 1, a method flow diagram according to the present invention is shown. In step S1, an audio stream (generated by a set of attendees and a set of participants) for an event containing crowd noise is captured (e.g., using a set of microphones) and time coded. The audio stream can be captured with a video stream as "content" for an event. Along these lines, the time coding in audio stream should match that in the video stream. That is, the audio affects should match its corresponding video affects from the event.

Figure 2:
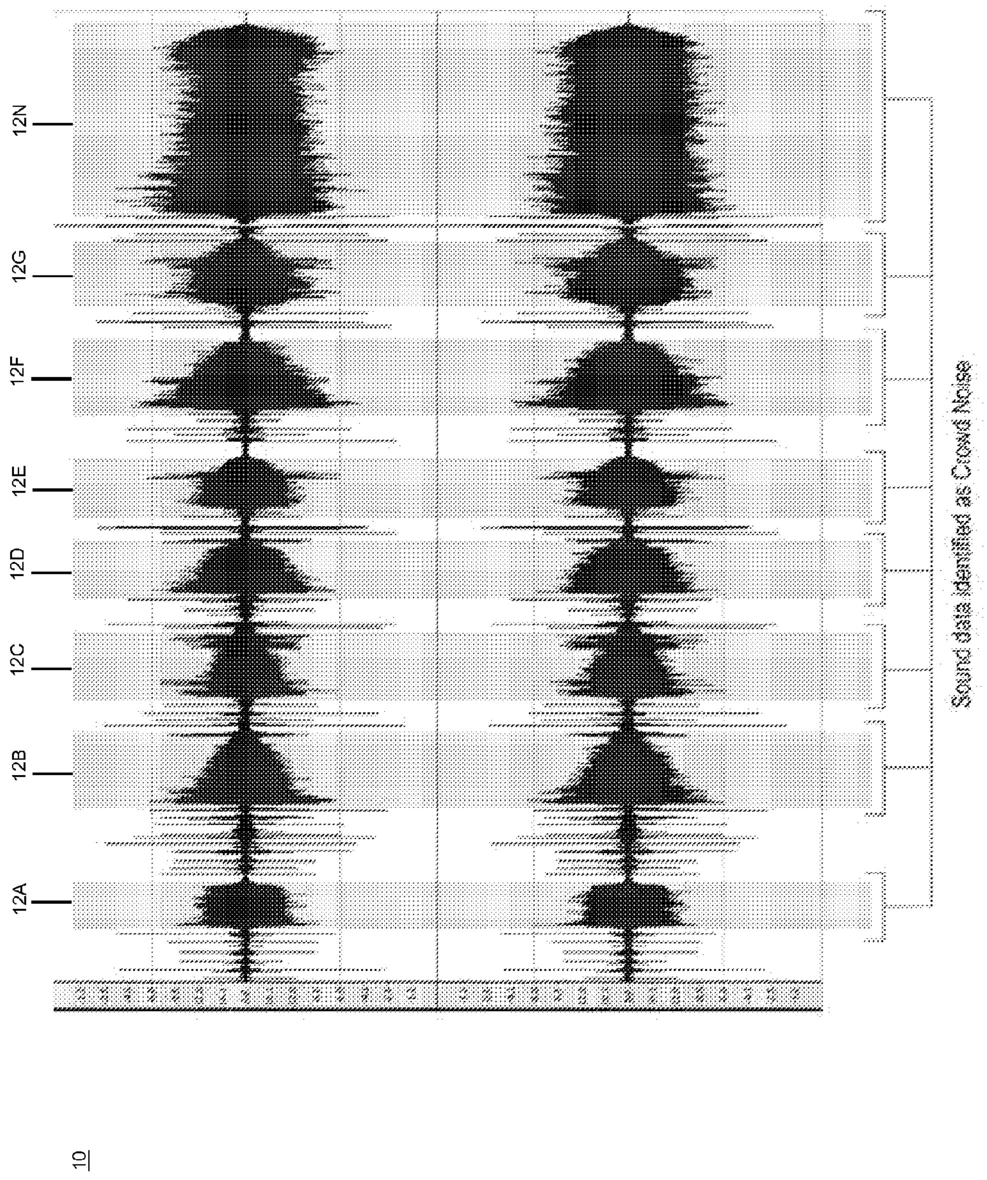
FIG. 2 depicts sound data identified as crowd noise according to the present invention.
Figure 3:
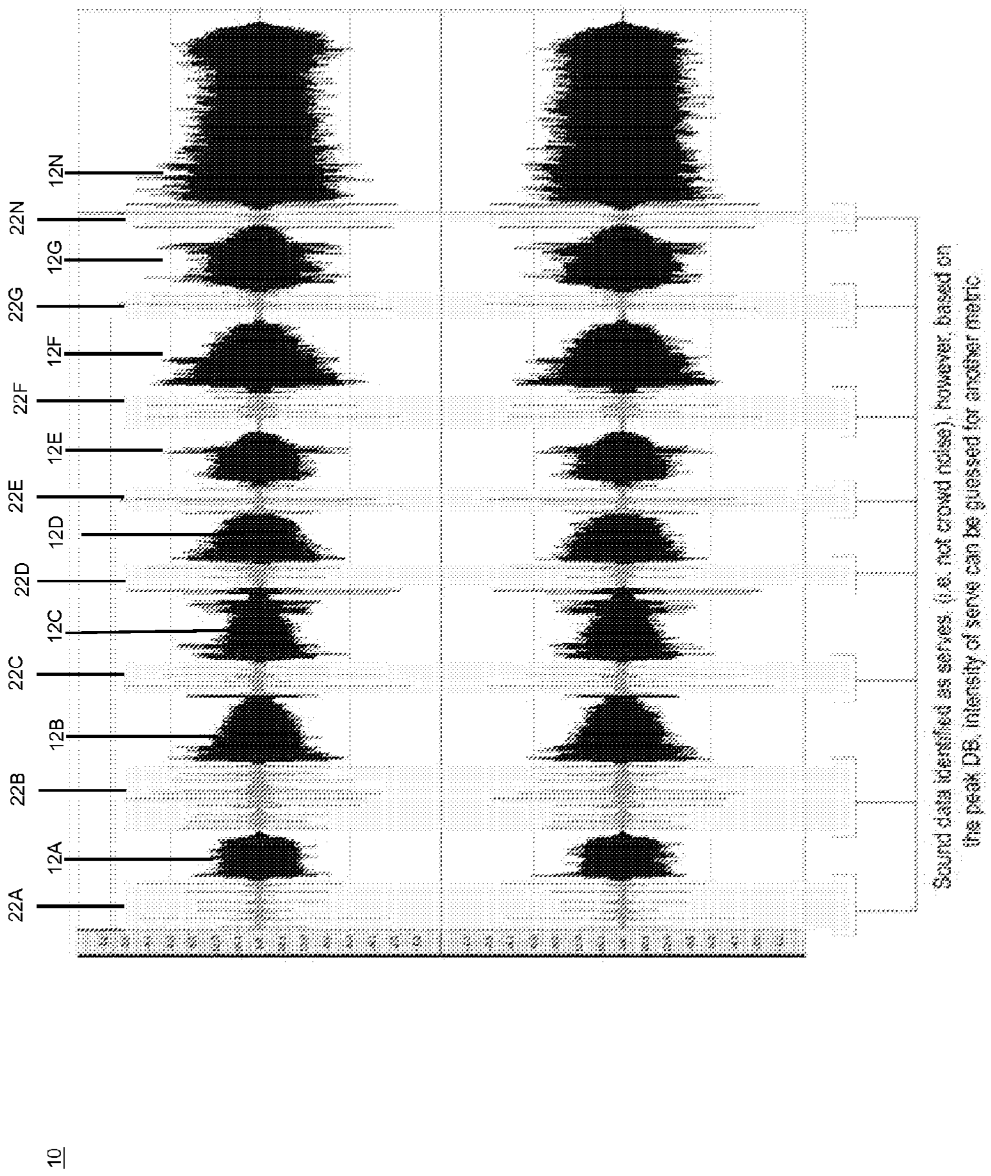
FIG. 3 depicts peaks in sound data according to the present invention.

Referring to FIG. 2, an illustrative audio stream 10 according to the present invention is shown. For illustrative purposes, assume audio stream was received pursuant to a tennis match. As depicted, regional 12A-N identify crowd noise based on the spikes in audio level. These serve as a gauge of crowd reaction to events occurring during the event. That is, the time before each region 12A-N is potentially a highlight that induced come reaction in the crowd. For example referring to FIG. 3, regions 22A-N of audio stream 10 precede regions 12A-N of crowd reaction. In this example, regions 22A-N were identified as serves, and regions 12A-N were identified as the crowd's corresponding reaction. Due to the larger size of region 12N (as compared with regions 22A-N), the serve of region 22N could have been an ace, or the end of a game, set and/or match.

In step S2, the audio stream is pre-processed or normalized based on geography. Specifically, a geographic characteristic of a participant of the event can be compared to a geographic characteristic of the event to identify a home participant of the event. Examples of geographic characteristics of the participant can include location town, city, state, country, etc. of residence or birth. Examples of geographic characteristics of the event can include town/city/state/country in which the event is taking place. In a typical embodiment, normalization of the audio stream includes loading geographical information to decide who has the "home" team advantage. The process can have a configurable threshold to take the audio data from each player. This will help identify a set of highlights as the home crowd will likely be more vocal when the home player scores.

Referring back to FIG. 1, step S3 is broken down into several sub-steps for processing the audio stream to remove undesired artifacts and to identify a set of highlights from the crowd noise. Specifically, in step S3A a target sound range is identified, and frequencies that vary from the target sound range by more than a predetermined tolerance are removed. That is, the audio stream is filtered to remove unimportant frequencies (e.g., those which are much lower or much higher than the target sound ranges). In this step configurable parameters include low-pass frequency (LPF) and high-pass frequency (HPF).

Figure 4:
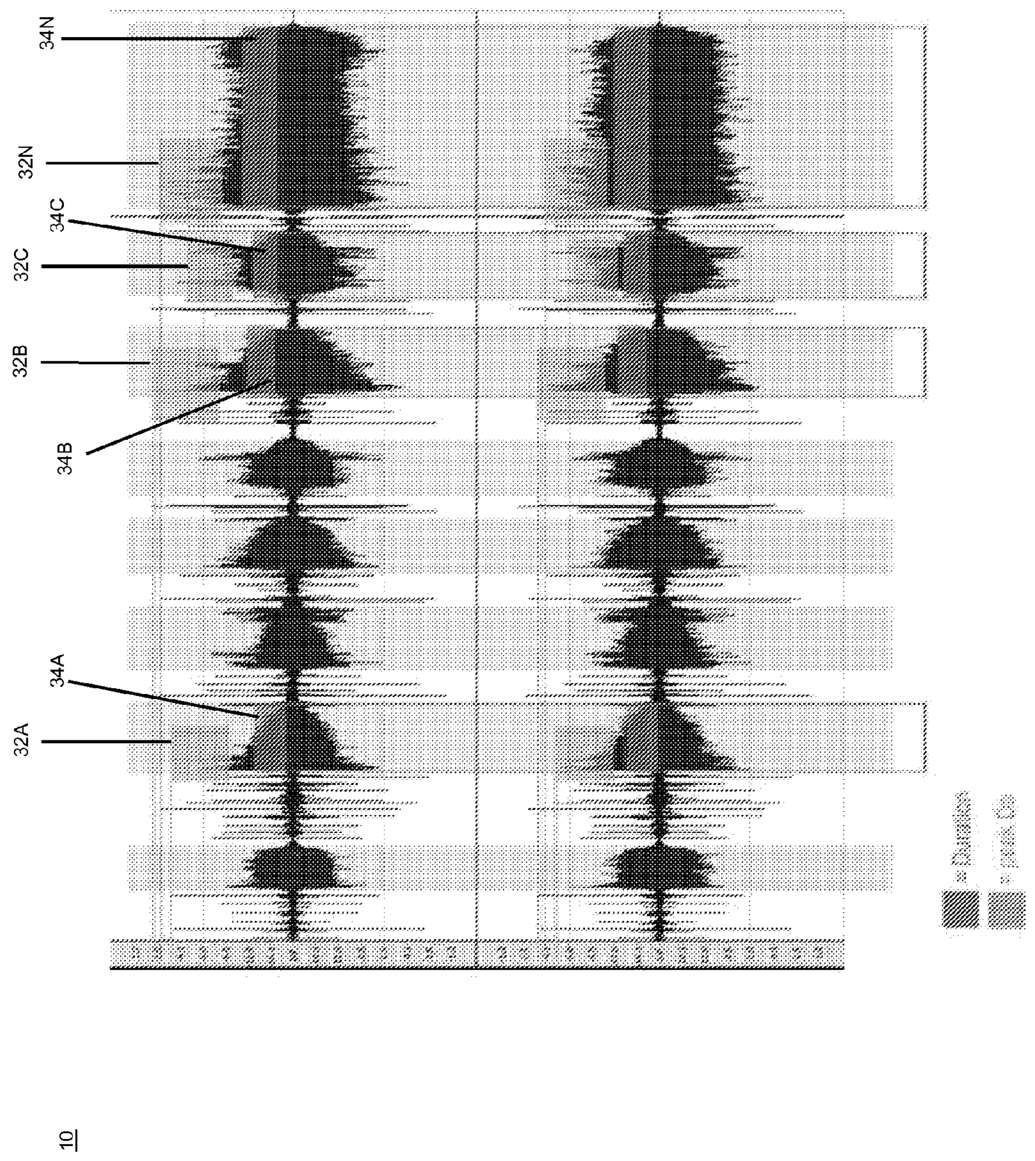
FIG. 4 depicts peaks in sound data for “N” duration according to the present invention.

In step S3B a level measurement of the audio stream is taken over a predetermined time window to eliminate spikes. An example of the peaks and durations of crowd reaction/noise is shown in FIG. 4. As depicted, regions 32A-N illustrate some peak decibel levels in crowd reaction, while regions 34A-N illustrate duration of the corresponding regions (12A, 12F, 12G, and 12N as labeled in FIGS. 2-3). A configurable parameter in this step is level smoothing window width.

Referring back to FIG. 1, in step S3C, a frequency-domain representation of the audio stream is generated perhaps using a Discrete Fourier Transform or similar method. This stream is also time averaged to eliminate spikes. The stream is then compared to frequency-domain models of the sounds to be detected. The degree of similarity can then be taken as another measurement. In this step, configurable parameters include: frequency-domain smoothing window width; frequency-domain transform resolution; and target stream modeling.

In step S3D, a squelch algorithm is applied to each measurement stream (e.g., including the audio stream) to eliminate undesired artifacts (i.e., audio noise as opposed to crowd noise) that could potentially cause false-positives. Then, the two streams are weighted and summed to produce a final "response level" measurement. Configurable parameters for this step include: level squelch threshold; similarity squelch threshold; level gain; and similarity gain. The response level measurement can be meaningful to other systems that could possibly detect minimum levels to trigger interactive events or mark key moments in a timeline. With a predetermined number of needed highlights for a highlight "reel," the "best" clips are chosen based on the thresholds that were given.

In step S4, the results are sent to an assembler who will select/isolate at least one highlight from the set of highlights based on the level squelch threshold and/or the similarity squelch threshold. The assembly of these highlights can also be automated. Using the time code that exists on the video from capture, the assembly tool can pick the points from beginning to end based on the scoring data. At this point, the deliverable can be a single, assembled reel, or a highlight "bookmark" list.

II. Computerized Implementation

Figure 5:
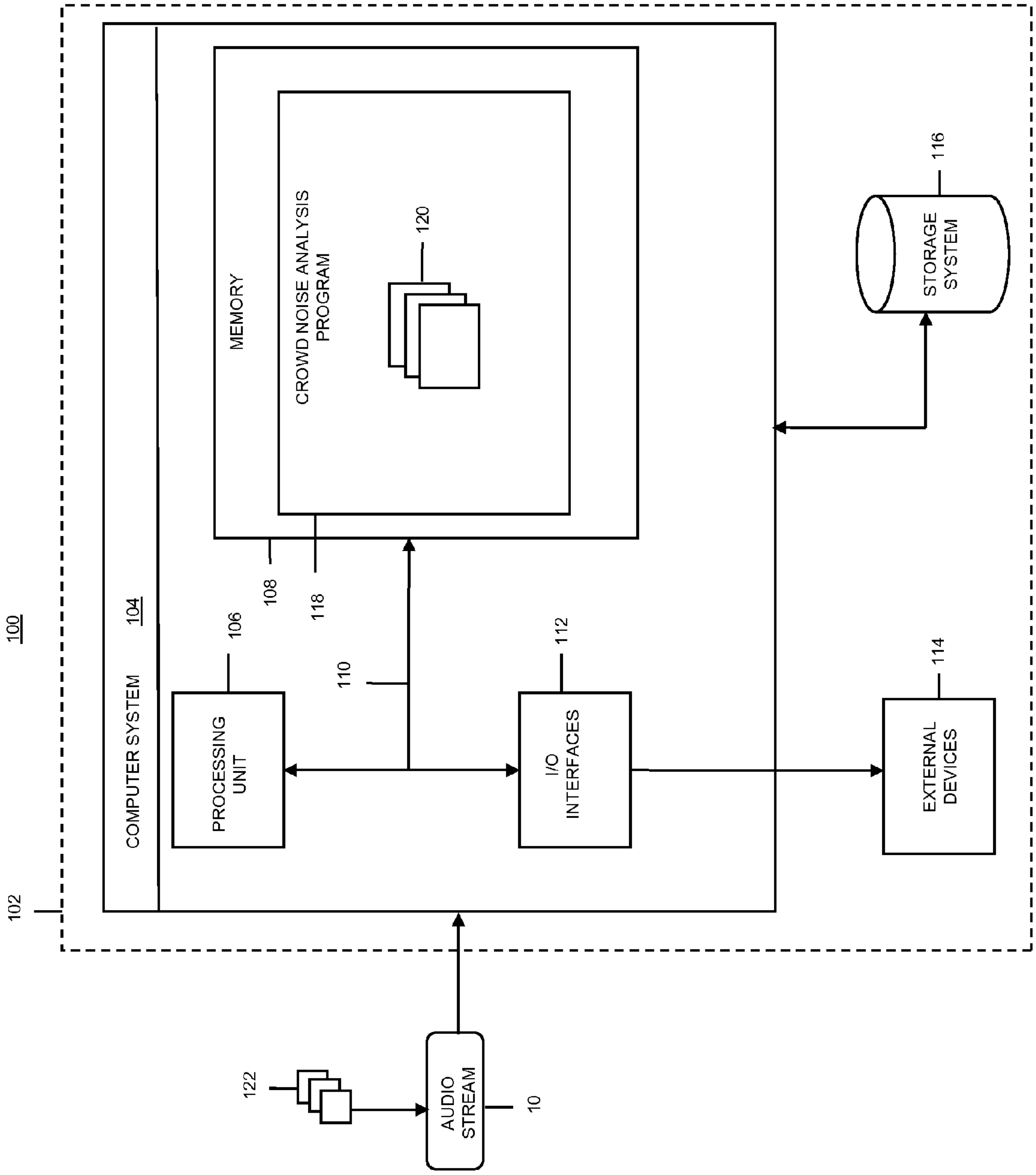
FIG. 5 depicts computerized implementation according to the present invention.

Referring now to FIG. 5, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as crowd noise analysis program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server.

Similarly, memory 108 and/or storage system 116 can comprise any combination of various types of data storage and/or transmission media that reside at one or more physical locations. Further, I/O interfaces 112 can comprise any module for exchanging information with one or more external device 114. Still further, it is understood that one or more additional components (e.g., system software, math co-processing unit, etc.) not shown in FIG. 5 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is crowd noise analysis program 118, which a set (at least one) of modules 120. The modules generally provide the functions of the present invention as described herein. Specifically (among other things), set of modules 120 is configured to: receive an audio stream 10 (captured by a set of microphone (s) 122) containing crowd noise for an event (e.g., a sporting event, a political rally, a religious, etc.); time code audio stream 10; normalizing audio stream 10 based on geography; and process audio stream 10 to remove undesired artifacts and to identify a set of highlights from the crowd noise. Further, set of modules 120 is configured to automatically select at least one highlight being selected from the set of highlights based on at least one threshold (e.g., a level squelch threshold and a similarity squelch threshold). In normalizing audio stream 10, set of modules 122 is configured to compare a geographic characteristic of a participant of the event to a geographic characteristic of the event to identify a home participant of the event. In addition, in processing audio stream 10, set of modules 122 is configured to identify a target sound range; remove frequencies that vary from the target sound range by more than a predetermined tolerance; take a level measurement of audio stream 10 over a predetermined time window to eliminate spikes; generate a frequency-domain representation of audio stream 10; time average audio stream 10 to eliminate the spikes; apply a squelch algorithm to eliminate the undesired artifacts; and weight audio stream 10 and the frequency-domain representation to produce a final response level measurement.

While shown and described herein as a method, system, and program product for analyzing crowd noise (to identify highlight(s)), it is understood that the invention further provides various alternative embodiments. For example, in one embodiment, the invention provides a computer-readable/usable medium that includes computer program code to enable a computer infrastructure to analyze crowd noise. To this extent, the computer-readable/usable medium includes program code that implements each of the various process of the invention. It is understood that the terms computer-readable medium or computer usable medium comprises one or more of any type of physical embodiment of the program code. In particular, the computer-readable/usable medium can comprise program code embodied on one or more portable storage articles of manufacture (e.g., a compact disc, a magnetic disk, a tape, etc.), on one or more data storage portions of a computing device, such as memory 108 (FIG. 5) and/or storage system 116 (FIG. 5) (e.g., a fixed disk, a read-only memory, a random access memory, a cache memory, etc.), and/or as a data stream (e.g., a propagated stream) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to analyze crowd noise. In this case, the service provider can create, maintain, support, etc., a computer infrastructure, such as computer infrastructure 102 (FIG. 5) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for analyzing crowd noise. In this case, a computer infrastructure, such as computer infrastructure 102 (FIG. 5), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 5), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for analyzing crowd noise, comprising:

receiving an audio stream for an event having a first participant and a second participant located at a venue, the audio stream containing crowd noise from a crowd that is distinct from the first participant and the second participant;

determining a geography for the event, the geography including geographic characteristics that include a geographic location of the venue of the event;

time coding the audio stream;

comparing a geographic characteristic of the first and second participants to the geographic characteristics of the event to identify one of the first participant or the second participant as a home participant of the event;

normalizing the audio stream based on the geography and the home participant; and processing substantially an entirety of the audio stream with a computer device to remove undesired artifacts and to identify, from noise levels in the substantially the entirety of the audio stream, a set of highlights from the crowd noise.

2. The method of claim 1, further comprising selecting at least one highlight from the set of highlights based on at least one threshold.

3. The method of claim 2, the at least one threshold being selected from the group consisting of: a level squelch threshold and a similarity squelch threshold.

4. The method of claim 1, the processing comprising:

identifying a target sound range;

removing frequencies that vary from the target sound range by more than a predetermined tolerance;

taking a level measurement of the audio stream over a predetermined time window to eliminate spikes;

generating a frequency-domain representation of the audio stream;

time averaging the audio stream to eliminate the spikes;

applying a squelch algorithm to eliminate the undesired artifacts; and weighting the audio stream and the frequency-domain representation to produce a final response level measurement.

5. The method of claim 1, the event being selected from a group consisting of a sporting event, a political rally, and a religious gathering.

6. The method of claim 1, the audio stream being generated by a set of from participants and a set of attendees of the event.

7. The method of claim 1, further comprising capturing the audio stream using a set of microphones.

8. A system for analyzing crowd noise, comprising:

a computer system, having:

a module for receiving an audio stream for an event having a first participant and a second participant located at a venue, the audio stream containing crowd noise from a crowd that is distinct from the first participant and the second participant;

a module for time coding the audio stream;

a module for normalizing the audio stream configured to:

determine a geography for the event, the geography including geographic characteristics that include a geographic location of the venue of the event;

compare a geographic characteristic of the first and second participants to the geographic characteristics of the event to identify one of the first participant or the second participant as a home participant of the event; and normalize the audio stream based on the geography and the home participant; and a module for processing substantially an entirety of the audio stream to remove undesired artifacts and to identify, from noise levels in the substantially the entirety of the audio stream, a set of highlights from the crowd noise.

9. The system of claim 8, further comprising a module for selecting at least one highlight from the set of highlights based on at least one threshold.

10. The system of claim 9, the at least one threshold being selected from the group consisting of: a level squelch threshold and a similarity squelch threshold.

11. The system of claim 8, the module for processing being configured to:

- identify a target sound range;
- remove frequencies that vary from the target sound range by more than a predetermined tolerance;
- take a level measurement of the audio stream over a predetermined time window to eliminate spikes;
- generate a frequency-domain representation of the audio stream;
- time average the audio stream to eliminate the spikes;
- apply a squelch algorithm to eliminate the undesired artifacts; and
- weight the audio stream and the frequency-domain representation to produce a final response level measurement.

12. The system of claim 8, the event being selected from a group consisting of a sporting event, a political rally, and a religious gathering.

13. The system of claim 8, the audio stream being generated by a set of from participants and a set of attendees of the event.

14. The system of claim 8, the audio stream being captured using a set of microphones.

15. A computer readable storage device having a program product for analyzing crowd noise stored thereon, the computer readable storage device comprising program code for causing a computer system to:

- receive an audio stream for an event having a first participant and a second participant located at a venue, the audio stream containing crowd noise from a crowd that is distinct from the first participant and the second participant;
- determine a geography for the event, the geography including geographic characteristics that include a geographic location of the venue of the event;
- time code the audio stream;
- compare a geographic characteristic of the first and second participants to the geographic characteristics of the event to identify one of the first participant or the second participant as a home participant of the event;
- normalize the audio stream based on the geography and the home participant; and
- process substantially an entirety of the audio stream to remove undesired artifacts and to identify, from noise levels in the substantially the entirety of the audio stream, a set of highlights from the crowd noise.

16. The program product of claim 15, the computer readable storage device further comprising program code for causing the computer system to: select at least one highlight from the set of highlights based on at least one threshold.

17. The program product of claim 16, the at least one threshold being selected from the group consisting of: a level squelch threshold and a similarity squelch threshold.

18. The program product of claim 15, the computer readable storage device further comprising program code for causing the computer system to:

- identify a target sound range;
- remove frequencies that vary from the target sound range by more than a predetermined tolerance;
- take a level measurement of the audio stream over a predetermined time window to eliminate spikes;
- generate a frequency-domain representation of the audio stream;
- time average the audio stream to eliminate the spikes;
- apply a squelch algorithm to eliminate the undesired artifacts; and
- weight the audio stream and the frequency-domain representation to produce a final response level measurement.

19. The program product of claim 15, the event being selected from a group consisting of a sporting event, a political rally, and a religious gathering.

20. The program product of claim 15, the audio stream being generated by a set of from participants and a set of attendees of the event.

21. The program product of claim 15, the audio stream being captured using a set of microphones.

22. A method for deploying a system for analyzing crowd noise, comprising:

- providing a computer infrastructure having a computer device being operable to:
  - receive an audio stream for an event having a first participant and a second participant located at a venue, the audio stream containing crowd noise from a crowd that is distinct from the first participant and the second participant;
  - determine a geography for the event, the geography including geographic characteristics that include a geographic location of the venue of the event;
  - time code the audio stream;
  - compare a geographic characteristic of the first and second participants to the geographic characteristics of the event to identify one of the first participant or the second participant as a home participant of the event;
  - normalize the audio stream based on the geography and the home participant; and
  - process substantially an entirety of the audio stream to remove undesired artifacts and to identify, from noise levels in the substantially the entirety of the audio stream, a set of highlights from the crowd noise.

* * * * *